(12) United States Patent
Rodriguez et al.

(10) Patent No.: US 10,594,724 B2
(45) Date of Patent: Mar. 17, 2020

(54) NETWORK SECURITY USER INTERFACE FOR DOMAIN QUERY VOLUME TIME SERIES WITH CUSTOM SIGNAL MODIFICATIONS

(71) Applicant: Cisco Technology, Inc., San Jose, CA (US)

(72) Inventors: David Brandon Rodriguez, Berkeley, CA (US); Colin Evrad Seale, III, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 230 days.

(21) Appl. No.: 15/653,765

(22) Filed: Jul. 19, 2017

(65) Prior Publication Data

US 2019/0028506 A1    Jan. 24, 2019

(51) Int. Cl.
*H04L 29/06* (2006.01)
*H04L 29/12* (2006.01)
*H04L 12/26* (2006.01)
*G06F 16/2458* (2019.01)
*G06F 16/9537* (2019.01)

(52) U.S. Cl.
CPC ...... *H04L 63/1458* (2013.01); *G06F 16/2474* (2019.01); *G06F 16/9537* (2019.01); *H04L 43/067* (2013.01); *H04L 43/0876* (2013.01); *H04L 61/1511* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 8,572,733 B1 * | 10/2013 | Rockwood | H04L 63/1433 709/224 |
| 8,713,676 B2 | 4/2014 | Pandrangi et al. | |
| 8,943,039 B1 | 1/2015 | Grieselhuber et al. | |
| 9,276,956 B2 | 3/2016 | Geng et al. | |
| 9,558,352 B1 | 1/2017 | Dennison et al. | |
| 2004/0250124 A1 * | 12/2004 | Chesla | G06F 21/552 726/13 |
| 2010/0037314 A1 * | 2/2010 | Perdisci | H04L 63/1416 726/22 |

(Continued)

OTHER PUBLICATIONS

Kale, et al., "An Examination of Multivariate Time Series Hashing with Applications to Health Care", American Hospital Association Hospital Statistics, 10 pages, 2011, Health Forum, LLC, and the American Hospital Association.

(Continued)

*Primary Examiner* — Kaveh Abrishamkar
(74) *Attorney, Agent, or Firm* — Behmke Innovation Group LLC; James Behmke; Stephen D. LeBarron (57) ABSTRACT

In one embodiment, a device provides data indicative of a domain name system (DNS) query volume time series for a first network domain for display by an electronic display. The device receives a time series modification to the displayed time series. The device identifies one or more other network domains based on the received time series modification. The device provides data indicative of the identified one or more other network domains for display by the electronic display.

20 Claims, 8 Drawing Sheets

(56) References Cited

U.S. PATENT DOCUMENTS

| | | | | |
|---|---|---|---|---|
| 2012/0084860 A1* | 4/2012 | Cao | ............... | H04L 63/1441 |
| | | | | 726/23 |
| 2012/0096549 A1* | 4/2012 | Amini | ............. | H04L 63/1433 |
| | | | | 726/23 |
| 2012/0131192 A1* | 5/2012 | MacCarthaigh | .. | H04L 29/08288 |
| | | | | 709/226 |
| 2017/0070518 A1* | 3/2017 | Manadhata | ......... | H04L 63/0227 |
| 2017/0279846 A1* | 9/2017 | Osterweil | ........... | H04L 63/1441 |
| 2018/0234445 A1* | 8/2018 | Bhatt | ............. | H04L 63/1425 |

OTHER PUBLICATIONS

Kannan, et al., "Smart Reply: Automated Response Suggestion for Email", https://static.googleusercontent.com/media/research.google.com/en//pubs/archive/45189.pdf, KDD '16, 10 pages, Aug. 13-17, 2016, San Francisco, CA, USA.

Lian, et al., "Approximate Similarity Search over Multiple Stream Time Series", DASFAA 2007: Advances in Databases: Concepts, Systems and Applications , International Conference on Database Systems for Advanced Applications, 2007, pp. 962-968, Springer-Verlag.

\* cited by examiner

NETWORK SECURITY USER INTERFACE FOR DOMAIN QUERY VOLUME TIME SERIES WITH CUSTOM SIGNAL MODIFICATIONS

TECHNICAL FIELD

The present disclosure relates generally to computer networks, and, more particularly, to a network security user interface for domain query volume time series with custom signal modifications.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it is more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device provides data indicative of a domain name system (DNS) query volume time series for a first network domain for display by an electronic display. The device receives a time series modification to the displayed time series. The device identifies one or more other network domains based on the received time series modification. The device provides data indicative of the identified one or more other network domains for display by the electronic display.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
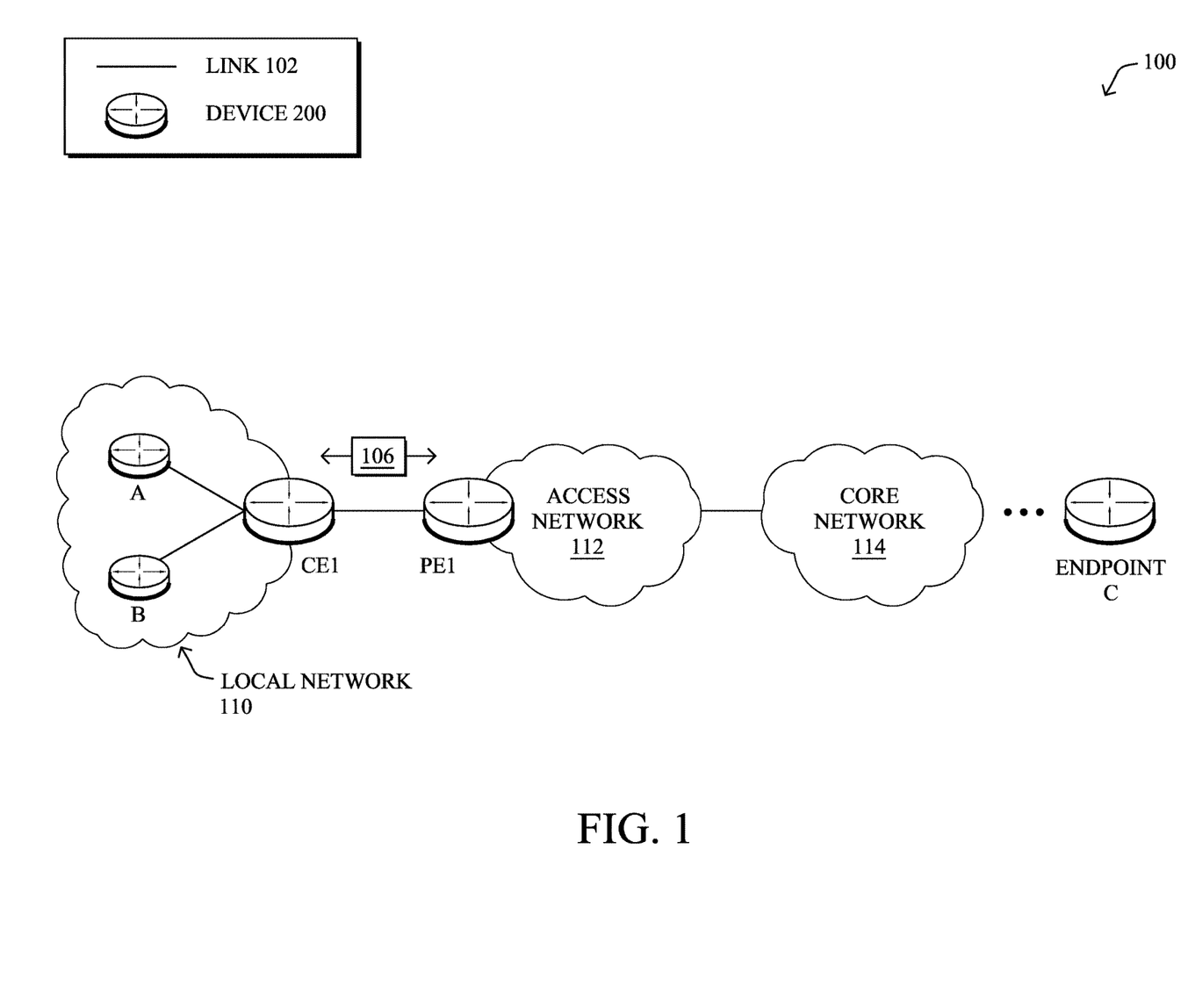
FIG. 1 illustrate an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the HTTPS protocol, to encrypt and decrypt data packets 106.

Figure 2:
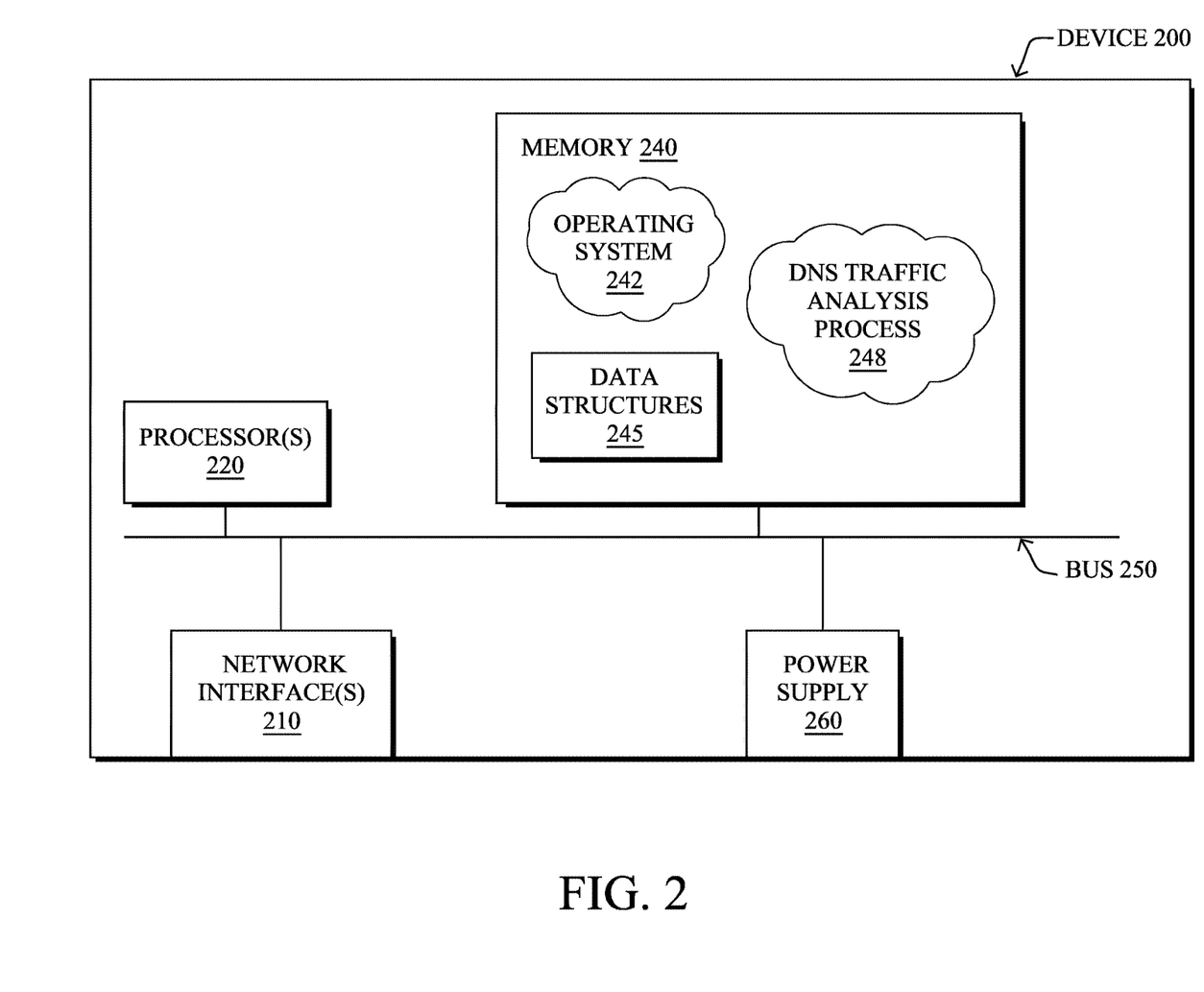
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a DNS traffic analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, botnets represent a security concern for network administrators. Once a client device has been infected with malware for the botnet, it may communicate with a command and control (C&C) server which sends control commands to the infected device. If the address of the C&C server is hardcoded into the malware itself, preventing operation of the botnet becomes a trivial task. Notably, all an administrator would need to do is block the address of the C&C server, to defeat control over the infected client device. However, many modern forms of malware do not use hardcoded addresses, but instead rely on domain generation algorithms (DGAs), to elude detection. Similar mechanisms are also used by other forms of malware, such as those that exfiltrate data from a network and the like.

In general, a DGA is a mechanism that generates a set of domain names based on some criteria, such as the time of day, month, year, etc. For example, a DGA may generate the domain names {a.com, b.com, a.b.com, . . . } on one day and the domains {bc.com, b.info, . . . } on the next day. In turn, the infected client device may perform a lookup of some or all of the generated domain names, to obtain the IP address of the C&C server.

Figure 3A:
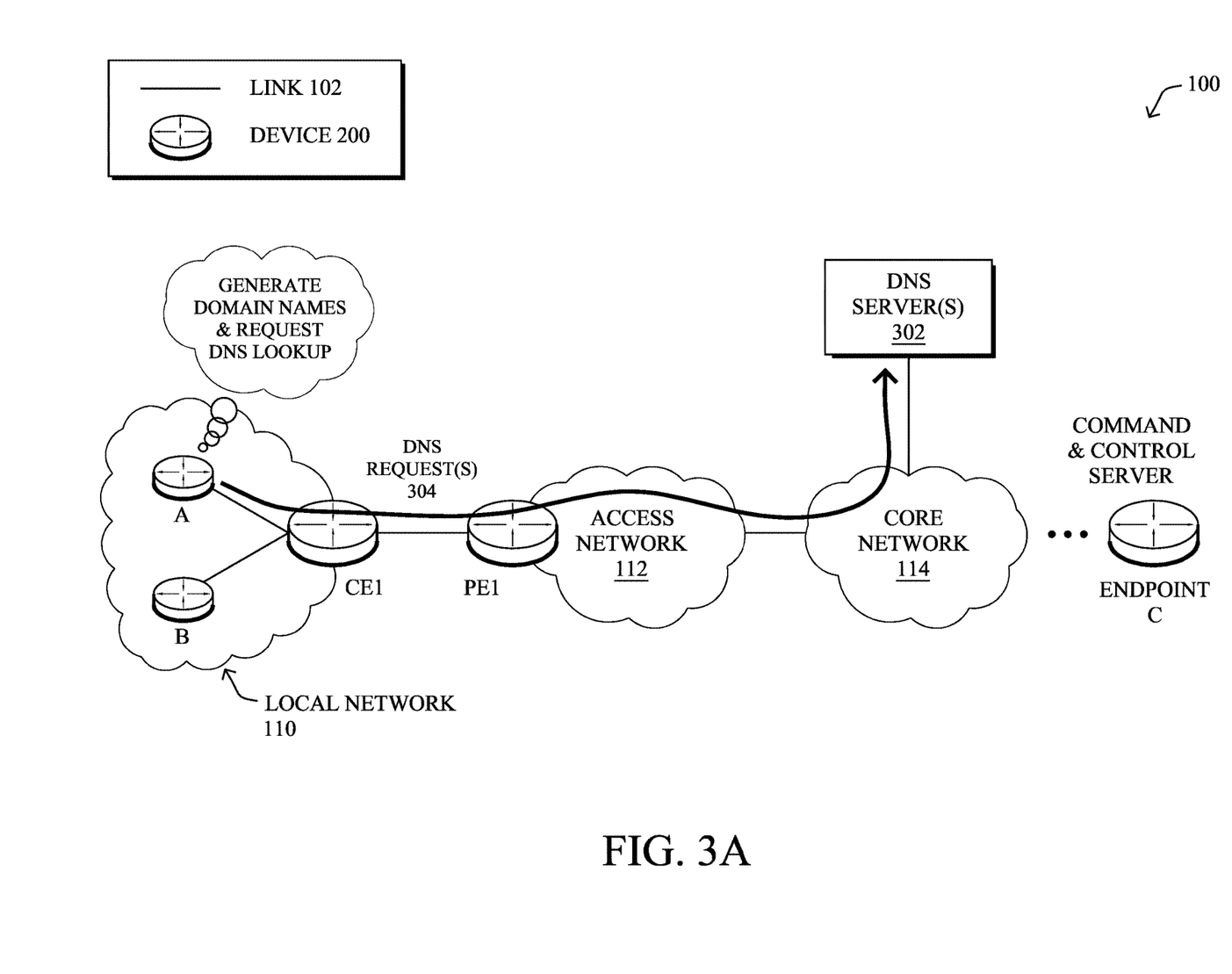
FIGS. 3A-3B illustrate an example of a domain name system (DNS) lookup.
Figure 3B:
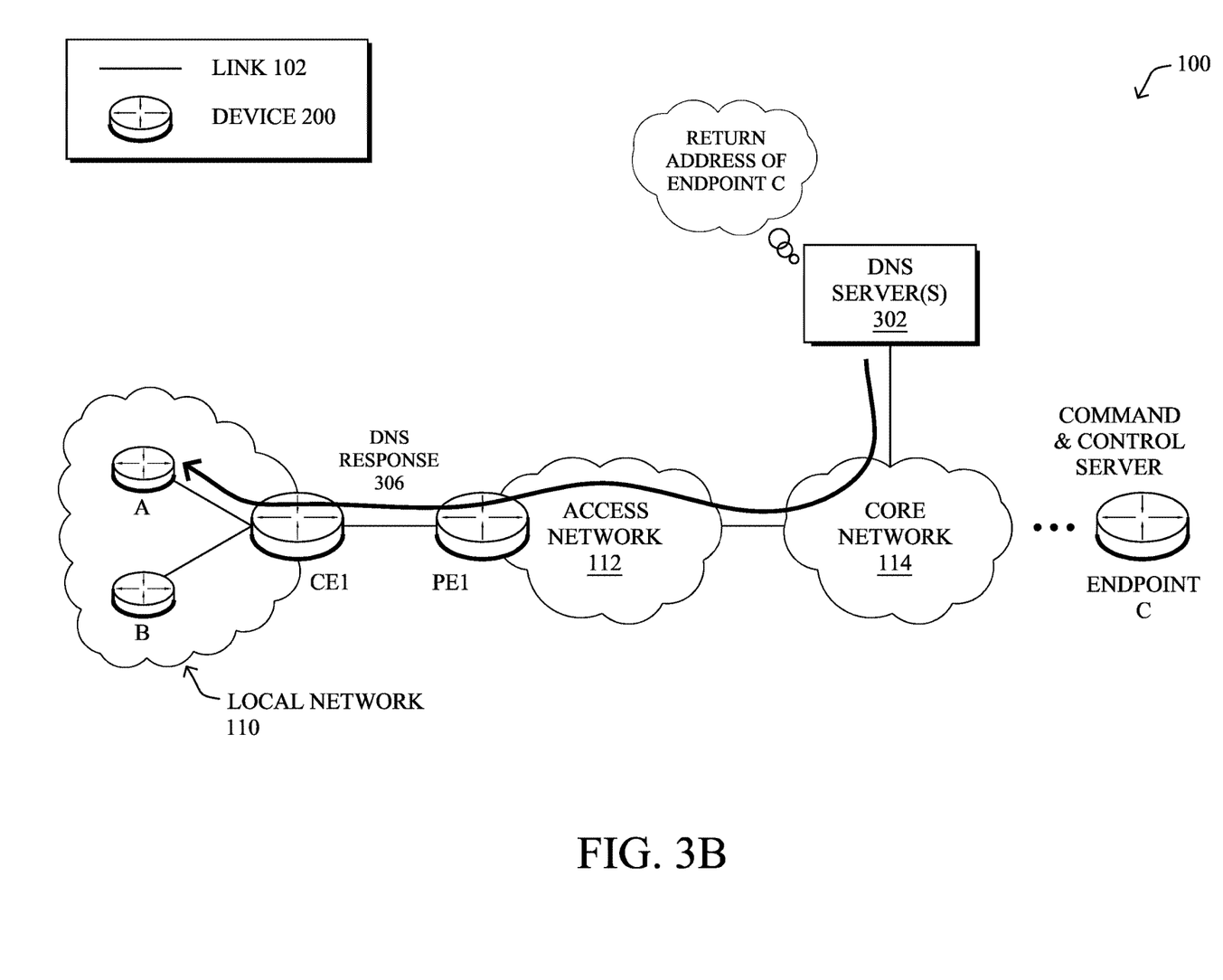

FIGS. 3A-3B illustrate an example of a domain name system (DNS) lookup. As shown, assume that client device A has been infected with malware that uses a DGA to communicate with a corresponding C&C server, endpoint device C shown. During operation, both infected client device A and endpoint C may execute a DGA to generate a corresponding set of domain names. In turn, endpoint C or the entity associated therewith may register one or more of the generated domain names with a DNS service (e.g., to associate the IP address of endpoint C with a generated domain name). Infected client device A may then send one or more DNS requests 304 to a DNS service provided by DNS server(s) 302, to look up the IP address associated with one or more of the generated domain names. This allows the C&C server to constantly switch IP addresses to avoid blocking mechanism and still retain control over the infected client devices.

To further avoid detection, the number of domain names generated by a DGA during any given time, the number of domain names registered to the C&C server during any given time, and/or the number of domain names queried by an infected client device may be variable. For example, if the DGA generates 100,000 domain names per day, the C&C server registers only one domain name per day, and an infected client queries 1,000 domain names per day, this gives the client a 1% chance of making contact with the C&C server during any given day. As shown in FIG. 3B, assume that the address of server C is registered to one of the DGA-generated domain names included in DNS request(s) 304. In such a case, DNS server 302 may include the address of server C in a DNS response 306 sent back to infected client device A. With this address, client device A is now able to make direct contact with the C&C server, endpoint C, to receive further commands for its installed malware.

As noted above, DNS queries can sometimes be indicative of a client device being infected with malware. Other examples of maliciousness attributable to a domain may include domains from which malware may be downloaded. For these and other reasons, information about the DNS traffic associated with different domains may be of use to a network administrator or security expert, to better identify threats.

However, a DNS traffic monitoring service (e.g., a device in the local network, a cloud-based service between the client and the DNS server, etc.), may observe a very high number of unique domains at any given time. For example, current DNS traffic monitoring services may observe queries for approximately 10-15 million unique domains (e.g., second level domains and top level domains) on an hourly basis. These domains can often vary in web-content due to the various images and links embedded on their webpages. The links, in particular, drive various forms of traffic to the domains.

From a security perspective, the DNS query volumes for a given network domain may give insight into the number of links on a page, as well as the type of users that may have similar web browsing taste. In particular, various forms of compromised or malicious domains may exhibit similar DNS query volumes when plotted against time (e.g., they attract similar users and may have similar content on their webpages). In addition, patterns can be identified from the query volumes for a domain, such as hailstorms and botnet-related activity.

First, hailstorm spam campaigns exhibit similar short bursts in their query volumes (e.g., spikes in their query volumes in a short period of time). In fact, these spikes appear to uniquely identify various spam campaigns and infrastructures. These spikes can also be assessed across different domains and may also occur at different points in time.

Second, domains associated with botnets also exhibit similar query volume patterns with respect to their DNS traffic. For example, known botnets have been observed to cause up to approximately 1,700 DNS queries to be issued for a particular domain within the span of a single hour.

Thus, botnets and other security concerns may exhibit periodic and cyclical query volume patterns. Rather than crawling websites for malicious content, this fact can be leveraged to identify potentially malicious domains or other domains of interest, based on their DNS query volumes.

Network Security User Interface for Domain Query Volume Time Series with Custom Signal Modifications The techniques herein introduce a user interface that allows a user to search by a domain's query-volume and to modify this series, as desired, to identify other domains that exhibit query volumes that exhibit similar DNS query volume time series as that of the modified series. In some aspects, the system may pre-processes the signal for the first domain, hash the time-series, and then search for similar domains using, e.g., using a hashing method that increases the probability of collision (e.g., locality sensitive hashing, etc.). To better target the identified domains presented to the user, the system may also rank the nearest K-number of time-series, based on a query t, returning those domains/time-series that share a registrant or hosting IP as query t.

Specifically, according to one or more embodiments of the disclosure as described in detail below, a device provides data indicative of a domain name system (DNS) query volume time series for a first network domain for display by an electronic display. The device receives a time series modification to the displayed time series. The device identifies one or more other network domains based on the received time series modification. The device provides data indicative of the identified one or more other network domains for display by the electronic display.

Illustratively, the techniques described herein may be performed by hardware, software, and/or firmware, such as in accordance with the DNS traffic analysis process 248, which may include computer executable instructions executed by the processor 220 (or independent processor of interfaces 210) to perform functions relating to the techniques described herein.

Figure 4:
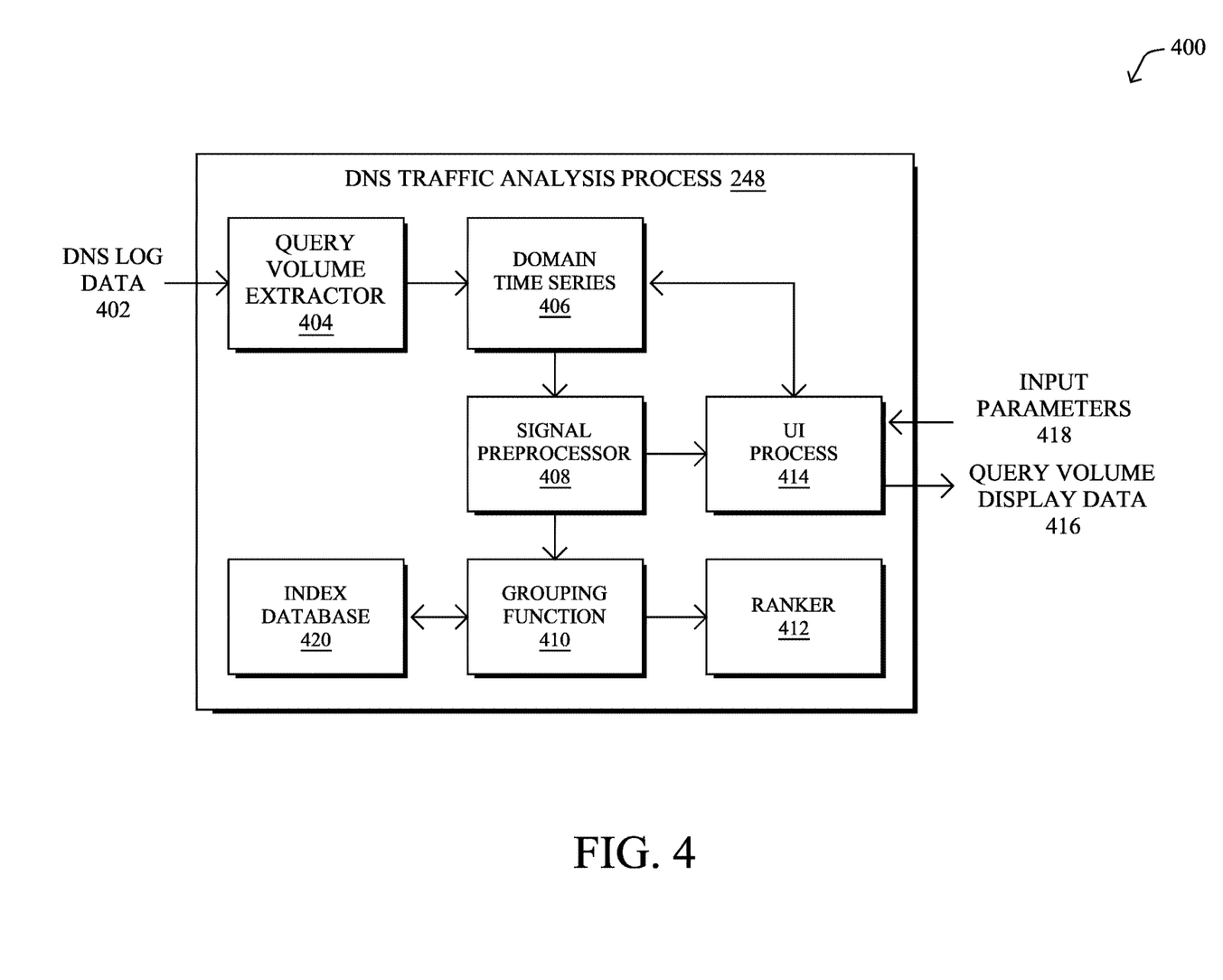
FIG. 4 illustrates an example architecture for a DNS traffic analysis process.

Operationally, FIG. 4 illustrates an example architecture for DNS traffic analysis process 248, according to various embodiments. In general, DNS traffic analysis process 248 may receive DNS log data 402, which may be captured by one or more intermediary devices between clients in the network and one or more DNS servers. For example, DNS traffic analysis process 248 may receive DNS log data 402 regarding DNS query and/or response traffic captured by an edge networking device (e.g., edge router, firewall, etc.), cloud-based service, or the like. In turn, DNS traffic analysis process 248 may present certain data for review by a user, such as a network administrator, security expert, or other interested party. To do so, DNS traffic analysis process 248 may execute any number of subroutines, such as those shown in FIG. 4 and described below. As would be appreciated, the subroutines shown are exemplary only and may be combined, divided, or even distributed across multiple devices, as desired.

DNS traffic analysis process 248 may include a query volume extractor 404 configured to parse DNS log data 402 into domain time series 406 for the various network domains for which DNS lookup request were observed in the network. Generally, domain time series 406 may, for a given network domain, include a generated time series of the DNS query volumes associated with that domain. For example, query volume extractor 404 may aggregate the DNS queries issued by any number of clients in the network for a domain 'A,' to form a query volume time series for domain 'A' in domain time series 406.

Another component of DNS traffic analysis process 248 may be a user interface (UI) process 414 configured to provide display data to a display to the user. Such a display may be a local display of the device executing process 248 or, alternatively, a display of a remote device located in the network. In some embodiments, such display data may include query volume display data 416. For example, a given query volume time series for a particular domain may be sent as part of query volume display data 416 (e.g., as a graphic, table, or other visual indicia) for display to the user.

DNS traffic analysis process 248 may also receive input parameters 418 from a user interface device via UI process 414. Generally, input parameters 418 may control the operation of DNS traffic analysis process 248, such as the display data sent by UI process 414 for display. Similar to the electronic display that displays query volume display data 416, input parameters 418 may be received via a user interface device that is either local to the device executing process 248 or remote thereto. For example, UI process 414 may receive input parameters 418 via a microphone (e.g., in the case of voice control), a pointing device (e.g., a mouse, etc.), a keypad or keyboard, the electronic display that displays data 416 (e.g., in the case of a touch screen display), or any other receives input from a user.

By way of example, input parameters 418 may specify the domain for which query volume data 416 is to be displayed and/or the time period for which the DNS query volume time series for that domain is to be displayed. In further embodiments, as detailed below, input parameters 418 may also include a modification to the displayed time series by the user, and/or other criteria that DNS traffic analysis process 248 may use to identify and display information regarding other domains that exhibit similar query volume time series as that of the modified time series for the displayed domain.

Figure 5:
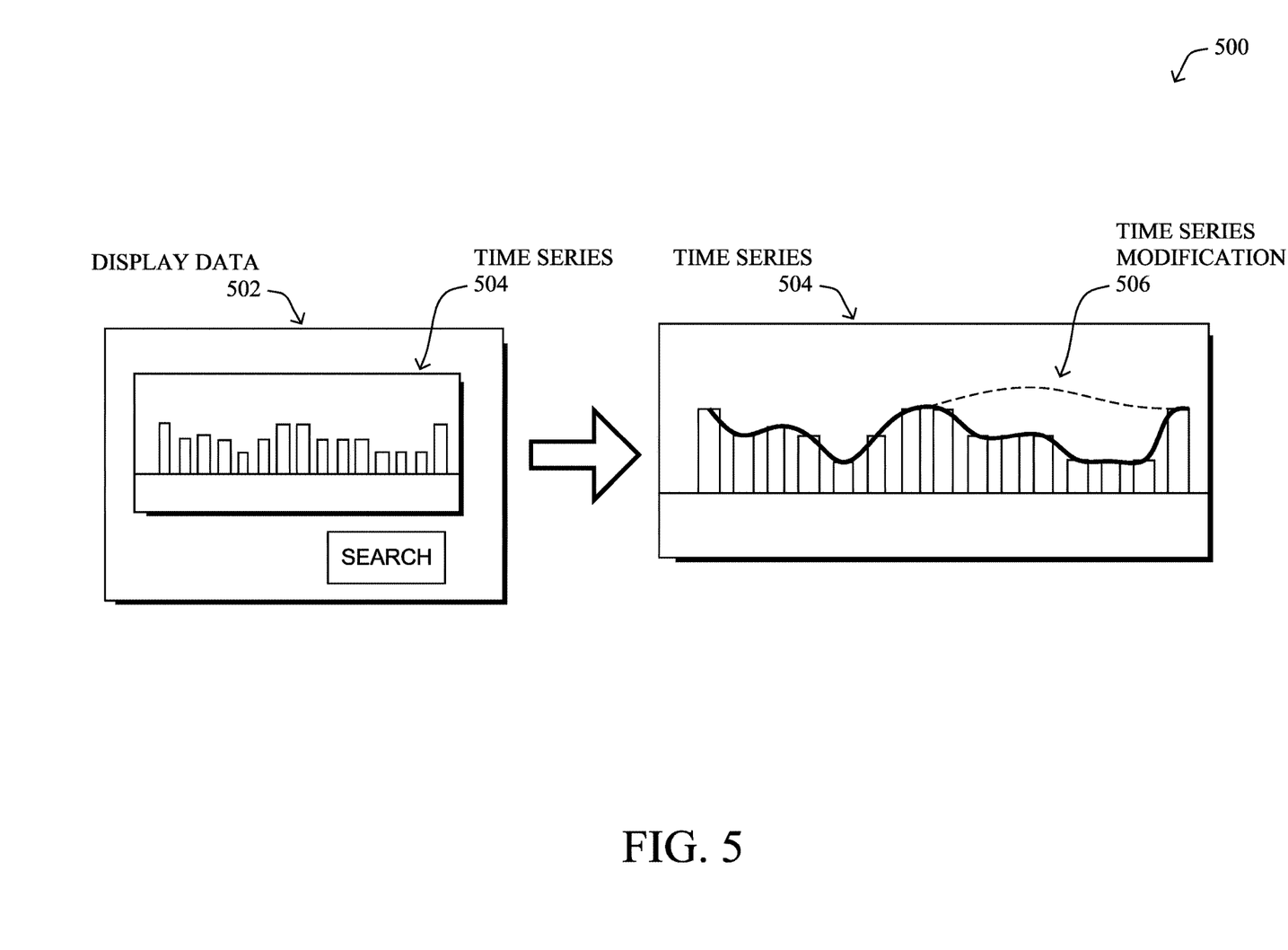
FIG. 5 illustrates an example of a user signal modification to a displayed query volume time series for a network domain.

Referring briefly to FIG. 5, an example 500 is shown of a user signal modification to a displayed query volume time series for a network domain, according to various embodiments. As shown, display data 502 may be provided by the DNS traffic analysis process and displayed on an electronic display. Notably, as shown, display data 502 may include time series indicia 504 of a DNS query volume time series for a particular network domain.

In various embodiments, the user interface associated with the DNS traffic analysis process may also be configured to receive input regarding the displayed time series 504, such as a time series modification 506. In other words, the user interface may allow the user to change the displayed DNS query volumes of time series 504 for any number of points of time in the time series. In turn, the system may identify any number of other domains that exhibit query volume time series that are similar to that of time series 504 with modification 506 applied. Thus, the user may be able to start with a base DNS query volume time series for a reference network domain and modify the displayed time series as desired to explore which other domains are similar to the modified time series.

By way of a more concrete example, assume that time series 504 is a graphical representation of the DNS query volume for a domain abcxyz.test. In turn, the user interface may allow the user to identify other domains that exhibit similar query volume patterns by manipulation of the displayed time series for domain abcxyz.test. For example, the user may manipulate the displayed time series for domain abcxyz.test, to increase the DNS query volume over a discrete window of time in the time series. In turn, the user interface may identify one or more other domains that exhibit similar query volume time series as that of the manipulated time series of abcxyz.test.

Referring again to FIG. 4, DNS traffic analysis process 248 may also include a signal preprocessor 408, a grouping function 410, and/or a ranker 412, to identify those domains that have similar query volume patterns as that of the displayed domain, as modified by the user. In general, DNS traffic analysis process 248 may, for a given time series, perform any or all of the following:

1. Pre-process the signal for better searching (e.g., an original time series for a domain with or without a user-specified modification applied).
2. Hash, and retrieve up to K-number of related time-series of other domains.
3. Optionally, further reduce the K-sized set of time series to size k (k<<K) based on various priority metrics.

To accomplish (1) above, signal preprocessor 408 may compress a signal t (e.g., a query volume time series from domain time series 406) in any number of different ways. In one embodiment, signal preprocessor 408 may decompose the signal t into wavelet coefficients. In another embodiment, signal preprocessor 408 may apply a sliding window technique to t that computes the mean, standard deviation, wavelength, zero-crossings, an/or other characteristics within a time window of t. Regardless of the technique used by signal preprocessor 408, signal t can be compressed from n-number of components into n'-number of components, with n'<<n.

For part (2), grouping function 410 may apply a hashing function to the compressed signals from signal preprocessor 408 that increases the probability of collision (e.g., a locality sensitive hashing function, a locality sensitive hashing function with random hyperplanes, etc.). Note too, that some buckets may have more or less time-series (e.g., the collisions based on the hash may be more or less frequent). In doing so, grouping function 410 can index and store the potentially millions of domains and their related query volume time series in an index database 420. For example, index database 420 may be a Hadoop-based storage system, such as HBase or other form of database. Having hashed the query volume time series for the different domains, grouping function 410 can then use locality sensitive hashing, or another technique, to find related time-series from index database 420.

For part (3) above, given a query volume time series for a domain (e.g., an observed time series or time series as modified by a user), DNS traffic analysis process 248 may also hash and arbitrarily limit the results of the similarity search of index database 420. Notably, in some embodiments, ranker 412 may be configured to limit the K-number of domains having similar time series as that of the reference time series to a set number k, based on prioritization criteria.

Figure 6:
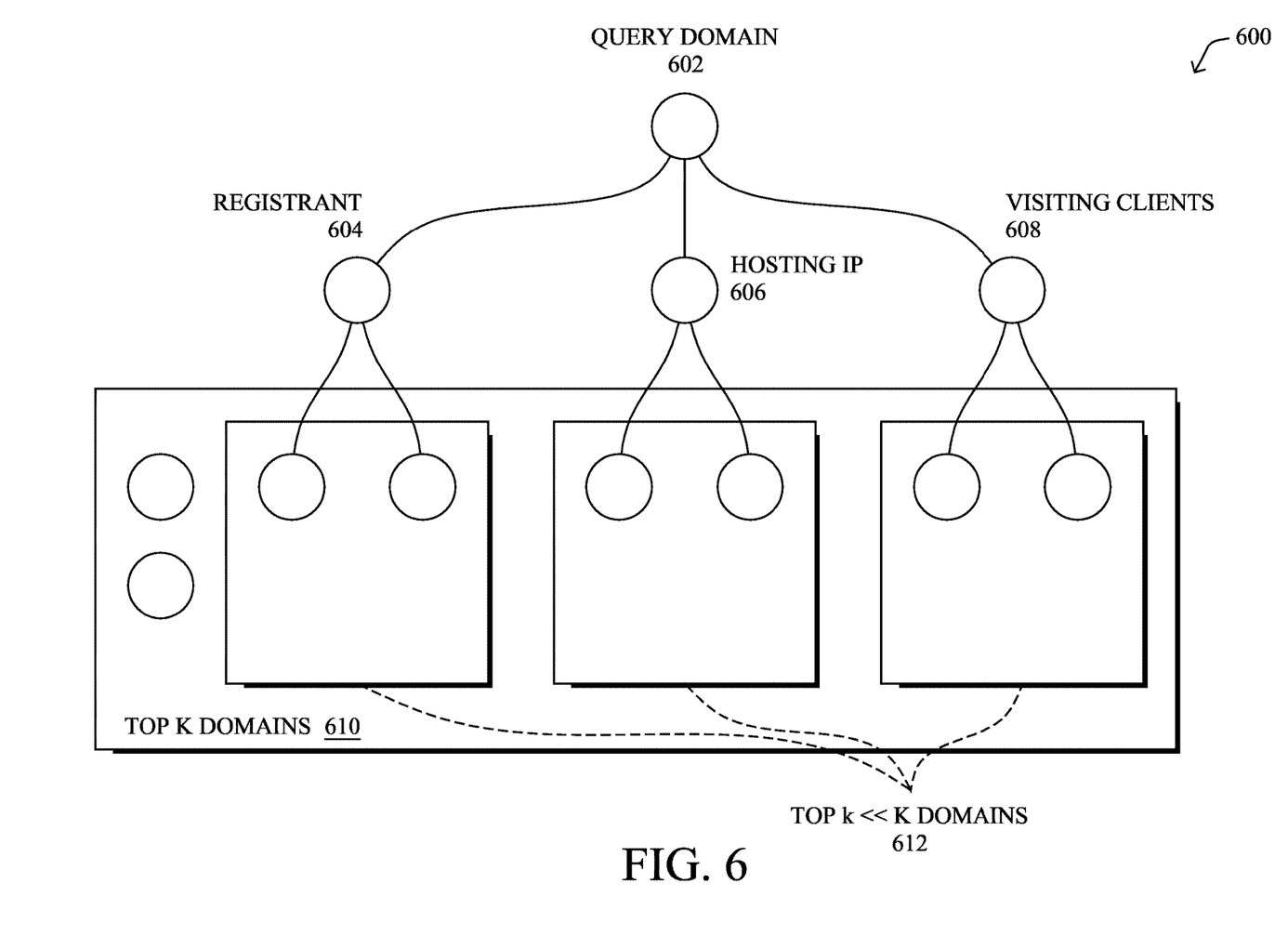
FIG. 6 illustrates an example methodology for selecting domains for display.

FIG. 6 illustrates an example methodology 600 for selecting domains for display, according to various embodiments. As shown, ranker 412 may begin by assessing the reference query domain 602, such as the domain displayed to the user via query volume display data 416. From this analysis, ranker 412 may extract out prioritization criteria such as the domain registrant 604 of the domain, the hosting IP address 3606 of the domain, and/or the visiting clients 608 to the domain.

Assume now that grouping function 410 identifies the top K-number of domains 610 that exhibit similar time series as that of the reference time series, from its analysis of index database 420. In such a case, ranker 612 may then reduce the resulting set of domains 610 further by prioritizing/ranking the domains 610 based on whether they match any of the prioritization criteria, such as having the same registrant 604, hosting IP 606, and/or visiting clients 608. For example, the user may specify via input parameters 418 that he or she wishes to review those time series of domains that are hosted on the same IP as that of the displayed time series (with potentially any user modifications). In another example, the user may specify via input parameters 418 that he or she wishes to see only those similar domains that share the same registrant 606 as the displayed domain or the domains that were frequently visited by other client devices.

Referring again to FIG. 4, the results of ranker 412 may correspond to the top k-number of domains/query volume time series that are similar to that of the displayed time series. In turn, ranker 412 may provide this information to UI process 414 for inclusion in query volume display data 416. In particular, if the user has modified the DNS query volume time series of the displayed domain, DNS traffic analysis process 248 may identify one or more other domains that exhibit DNS query volume time series that are closest to that of the modified time series. In turn, DNS traffic analysis process 248 may provide data indicative of these other domain(s) for display via UI process 414 (e.g., the names of the other domains, the corresponding time series of the domains, etc.).

Figure 7:
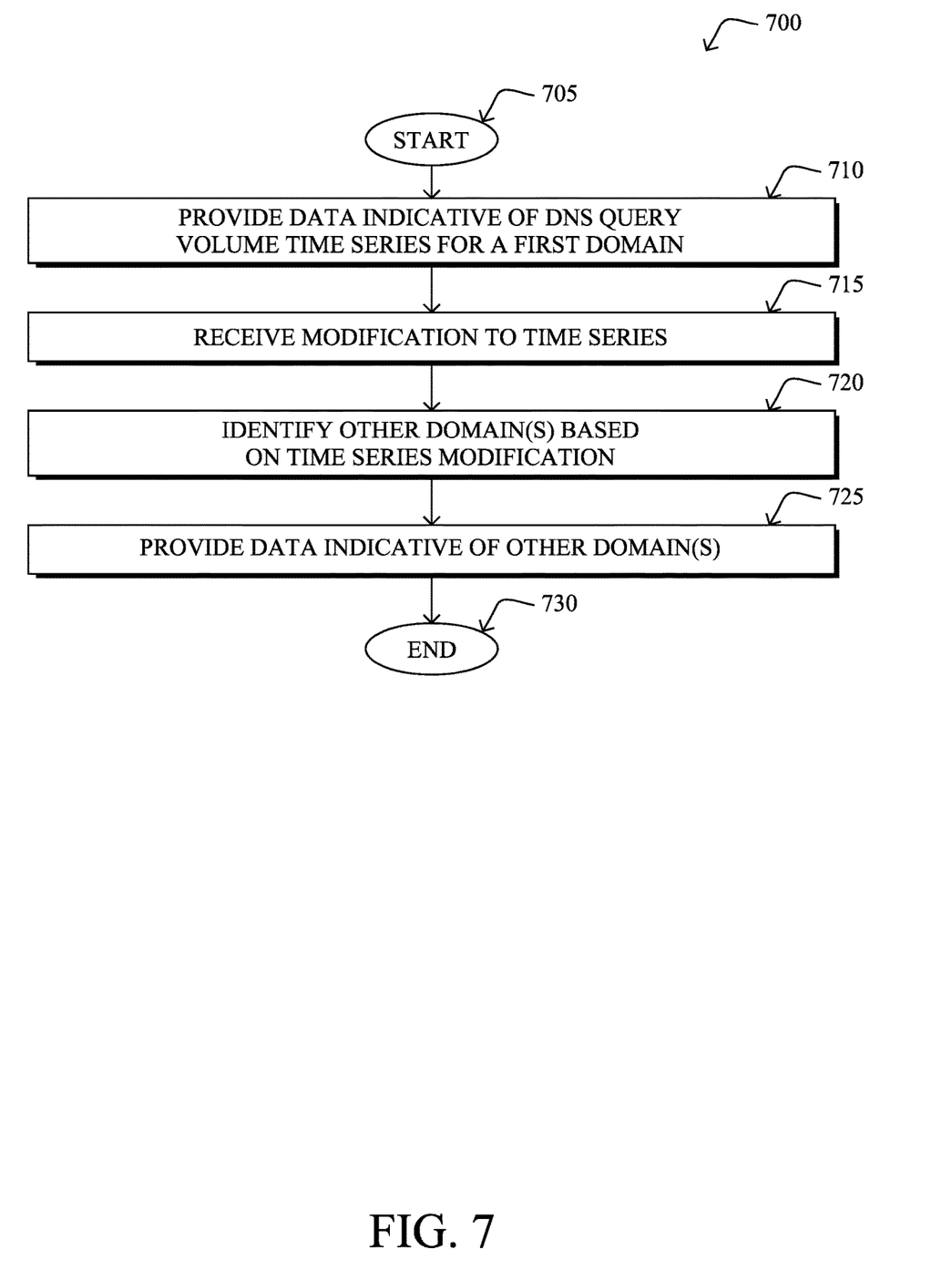
FIG. 7 illustrates an example simplified procedure for providing one or more domains for display based on an adjusted domain query volume time series.

FIG. 7 illustrates an example simplified procedure for providing one or more domains for display based on an adjusted domain query volume time series, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may provide data indicative of a domain name system (DNS) query volume time series for a first network domain for display by an electronic display. Such data may include, for example, a table, graph, or other representation of the time series of the DNS queries for the first domain. Notably, in some cases, the device may generate the time series by analyzing one or more DNS traffic logs captured from the observed network.

At step 715, as detailed above, the device may receive a time series modification to the displayed time series. For example, in response to presenting the data indicative of the first time series to a user, the device may receive input parameters from the user indicating a modification to the time series. Such a modification may be, e.g., a DNS query volume change to one or more points in time of the displayed query volume time series for the first network domain.

At step 720, the device may identify one or more other domains based on the received time series modification to the time series of the first domain, as described in greater detail above. In various embodiments, the device may employ any number of hashing techniques, to hash the time series of the first domain (with the applied user modification), as well as the time series of any number of other observed domains from DNS queries in the network. In doing so, the device may identify those other domains that exhibit DNS query volume time series similar to that of the modified time series of the displayed first domain. In one embodiment, the device may preprocess the hashed time series to compress the time series before applying the hashing.

In further embodiments, the device may also identify the other domain(s) by further requiring that the domains also share any number of characteristics with that of the first domain. For example, such characteristics may include, but are not limited to, a shared registrant, a shared Internet Protocol (IP) address, or a shared set of visiting clients between the first domain and the one or more other network domains. Thus, even if a domain exhibits a DNS query volume time series as that of the modified time series of the first domain, it may be excluded from the final set of other domain(s) if it does not also exhibit a match with the specified criteria.

At step 725, as detailed above, the device may provide data indicative of the identified one or more other network domains for display by the electronic display. For example, after identifying the other domain(s), the device may send a listing of the domain(s) for display, the corresponding DNS query volume time series for the other domain(s), and/or other information regarding the other domain(s) for display to the user. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, afford a user the unique ability to search for related domains by time-series based on their own transformation of a given signal (e.g., DNS query volume time series for a domain). In addition, this searching can be scaled to search across potentially hundreds of millions of domains/time series. In further aspects, the techniques can be used to further refine and rank those results based on relationships in common to other domains that are relevant to finding malicious websites and domains on the internet.

While there have been shown and described illustrative embodiments that provide for a user interface for domain query volume time series, it is to be understood that various other adaptations and modifications may be made within the spirit and scope of the embodiments herein. For example, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   providing, by a device, data indicative of a domain name system (DNS) query volume time series for a first network domain for display by an electronic display;
   receiving, at the device, a time series modification to the displayed time series;
   identifying, by the device, one or more other network domains that exhibit DNS query volume time series patterns that match at least a portion of a pattern in the received time series modification; and
   providing, by the device, data indicative of the identified one or more other network domains for display by the electronic display.

2. The method as in claim 1, further comprising:
   generating, by the device, the query volume time series for the first network domain by analyzing one or more domain name system (DNS) traffic logs.

3. The method as in claim 1, further comprising:
   receiving, by the device, an instruction to block traffic associated with at least one of the one or more other network domains identified based on the received time series modification.

4. The method as in claim 1, wherein the time series modification comprises a DNS query volume change to one or more points in time of the query volume time series for the first network domain.

5. The method as in claim 1, wherein identifying the one or more other network domains based on the received time series modification comprises:
   hashing, by the device, the query volume time series for the first network domain adjusted with the time series modification;
   hashing, by the device, a set of query volume time series for a plurality of network domains; and
   determining, by the device, measures of similarity between the hashed set of query volume time series for the plurality of network domains and the hashed query volume time series for the first network domain adjusted with the time series modification.

6. The method as in claim 5, wherein determining the measures of similarity comprises:
   performing locality sensitive hashing on the hashed set of query volume time series for the plurality of network domains and the hashed query volume time series for the first network domain adjusted with the time series modification.

7. The method as in claim 5, further comprising:
   selecting, by the device, the one or more other network domains from among the plurality of network domains based on the determined measures of similarity.

8. The method as in claim 7, wherein selecting the one or more other network domains from among the plurality of network domains further comprises:
   matching, by the device, one or more characteristics of the first domain to one or more characteristics of the one or more other network domains, wherein the matched characteristics comprise at least one of: a shared registrant, a shared Internet Protocol (IP) address, or a shared set of visiting clients between the first domain and the one or more other network domains.

9. The method as in claim 5, wherein hashing the query volume time series for the first network domain adjusted with the time series modification comprises:
decomposing, by the device, the query volume time series for the first network domain adjusted with the time series modification into a set of decompositions; and
hashing, by the device, the decompositions.

10. An apparatus, comprising:
one or more network interfaces to communicate with a network;
a processor coupled to the network interfaces and configured to execute one or more processes; and
a memory configured to store a process executable by the processor, the process when executed configured to:
provide data indicative of a domain name system (DNS) query volume time series for a first network domain for display by an electronic display;
receive a time series modification to the displayed time series;
identify one or more other network domains that exhibit DNS query volume time series patterns that match at least a portion of a pattern in the received time series modification; and
provide data indicative of the identified one or more other network domains for display by the electronic display.

11. The apparatus as in claim 10, wherein the process when executed is further configured to:
generate the query volume time series for the first network domain by analyzing one or more domain name system (DNS) traffic logs.

12. The apparatus as in claim 10, wherein the process when executed is further configured to:
receive an instruction to block traffic associated with at least one of the one or more other network domains identified based on the received time series modification.

13. The apparatus as in claim 10, wherein the time series modification comprises a DNS query volume change to one or more points in time of the query volume time series for the first network domain.

14. The apparatus as in claim 10, wherein the apparatus identifies the one or more other network domains based on the received time series modification by:
hashing the query volume time series for the first network domain adjusted with the time series modification;
hashing a set of query volume time series for a plurality of network domains; and
determining measures of similarity between the hashed set of query volume time series for the plurality of network domains and the hashed query volume time series for the first network domain adjusted with the time series modification.

15. The apparatus as in claim 14, wherein the apparatus determines the measures of similarity by performing locality sensitive hashing on the hashed set of query volume time series for the plurality of network domains and the hashed query volume time series for the first network domain adjusted with the time series modification.

16. The apparatus as in claim 14, wherein the process when executed is further configured to:
select the one or more other network domains from among the plurality of network domains based on the determined measures of similarity.

17. The apparatus as in claim 16, wherein the apparatus selects the one or more other network domains from among the plurality of network domains further by:
matching one or more characteristics of the first domain to one or more characteristics of the one or more other network domains, wherein the matched characteristics comprise at least one of: a shared registrant, a shared Internet Protocol (IP) address, or a shared set of visiting clients between the first domain and the one or more other network domains.

18. The apparatus as in claim 14, wherein the apparatus hashes the query volume time series for the first network domain adjusted with the time series modification by:
decomposing the query volume time series for the first network domain adjusted with the time series modification into a set of decompositions; and
hashing the decompositions.

19. A tangible, non-transitory, computer-readable medium storing program instructions that cause a device to execute a process comprising:
providing, by the device, data indicative of a domain name system (DNS) query volume time series for a first network domain for display by an electronic display;
receiving, at the device, a time series modification to the displayed time series;
identifying, by the device, one or more other network domains that exhibit DNS query volume time series patterns that match at least a portion of a pattern in the received time series modification; and
providing, by the device, data indicative of the identified one or more other network domains for display by the electronic display.

20. The computer-readable medium as in claim 19, wherein the process further comprises:
generating, by the device, the query volume time series for the first network domain by analyzing one or more domain name system (DNS) traffic logs.

* * * * *

UNITED STATES PATENT AND TRADEMARK OFFICE
CERTIFICATE OF CORRECTION

PATENT NO. : 10,594,724 B2
APPLICATION NO. : 15/653765
DATED : March 17, 2020
INVENTOR(S) : David Brandon Rodriguez et al.

Page 1 of 1

It is certified that error appears in the above-identified patent and that said Letters Patent is hereby corrected as shown below:

In the Specification

Column 1, Line 27, please amend as shown:
cious requests, making it more difficult to distinguish Signed and Sealed this
Twenty-third Day of June, 2020

Andrei Iancu
*Director of the United States Patent and Trademark Office*